(12) United States Patent
O'Brien et al.

(10) Patent No.: US 7,765,360 B2
(45) Date of Patent: *Jul. 27, 2010

(54) PERFORMING USEFUL COMPUTATIONS WHILE WAITING FOR A LINE IN A SYSTEM WITH A SOFTWARE IMPLEMENTED CACHE

(75) Inventors: John Kevin Patrick O'Brien, South Salem, NY (US); Kathryn O'Brien, South Salem, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/243,339

(22) Filed: Oct. 1, 2008

(65) Prior Publication Data

US 2009/0055588 A1    Feb. 26, 2009

Related U.S. Application Data

(63) Continuation of application No. 11/421,505, filed on Jun. 1, 2006, now Pat. No. 7,461,205.

(51) Int. Cl.
*G06F 12/00* (2006.01)
*G06F 9/06* (2006.01)
*G06F 9/30* (2006.01)
*G06F 9/40* (2006.01)

(52) U.S. Cl. ............... 711/118; 711/125; 711/123; 711/133; 711/154; 711/165; 711/213; 711/215

(58) Field of Classification Search ............... 711/125, 711/123, 133, 154, 165, 213, 215, 118
See application file for complete search history.

(56) References Cited

U.S. PATENT DOCUMENTS 6,751,583 B1    6/2004    Clarke et al.

*Primary Examiner*—Mardochee Chery
(74) *Attorney, Agent, or Firm*—Stephen J. Walder, Jr.; Matthew B. Talpis

(57) ABSTRACT

Mechanisms for performing useful computations during a software cache reload operation are provided. With the illustrative embodiments, in order to perform software caching, a compiler takes original source code, and while compiling the source code, inserts explicit cache lookup instructions into appropriate portions of the source code where cacheable variables are referenced. In addition, the compiler inserts a cache miss handler routine that is used to branch execution of the code to a cache miss handler if the cache lookup instructions result in a cache miss. The cache miss handler, prior to performing a wait operation for waiting for the data to be retrieved from the backing store, branches execution to an independent subroutine identified by a compiler. The independent subroutine is executed while the data is being retrieved from the backing store such that useful work is performed.

3 Claims, 6 Drawing Sheets

FIG. 2

SOURCE CODE (210)

```
.
.
.
for(i=0; i<100000;i++)
= ... d[f(i)]                    ~215
.
.
.
```

↓ COMPILATION

CODE WITH EXPLICIT CACHE LOOKUP (220)

```
.
.
.
for(i=0; i<100000;i++)
= ... d[f(i)]*cache_lookup(&d[f(i)])   ~230
.
.
.
inline vector cache_lookup(addr){
  if(cache_directory[addr&key_mask] != (addr&tag_mask))
    miss_handler(addr);
  return cache_data[addr&key_mask][addr&offset_mask];
}
```
}240

```
20:   VAND      vr884=gr664, vr842
20:   LI        vr847=0x10203
20:   VLR       *vr846=vr847
20:   VSHUFB    vr848=gr664,gr664,vr846
20:   VLR       *vr845=vr848
20:   VAND      vr849-vr843, vr845
20:   VLQ       vr850=.L_tagaddr(relative, 0)
20:   A         gr851=vr844, vr850
20:   VLQ       vr852=.L_tagarray(gr851,0)
20:   VLQ       vr853=.L_tagarray(gr851,16)
20:   VANDC     vr854=gr664, vr843
20:   VCEQW     vr855=vr849, vr852
20:   VGBB      vr856=vr855
20:   VCNTLZ    vr857=vr855
20:   VQBR      vr858=vr853, vr857, gr1
20:   MISS      *vr858, .L_tagarray=gr664, vr856, vr858
20:   A         gr859=vr854, vr858
20:   VLR       *gr799=gr859
20:   LI        vr847=0x10203
20:   VLR       *vr846=vr847
20:   VSHUFB    vr848=gr664, gr664, vr846
20:   VLR       *vr845=vr848
20:   VLQ       vr800=c[]0(gr799,0)
20:   LR        *vr663=vr800
```

310 points to the MISS instruction line.

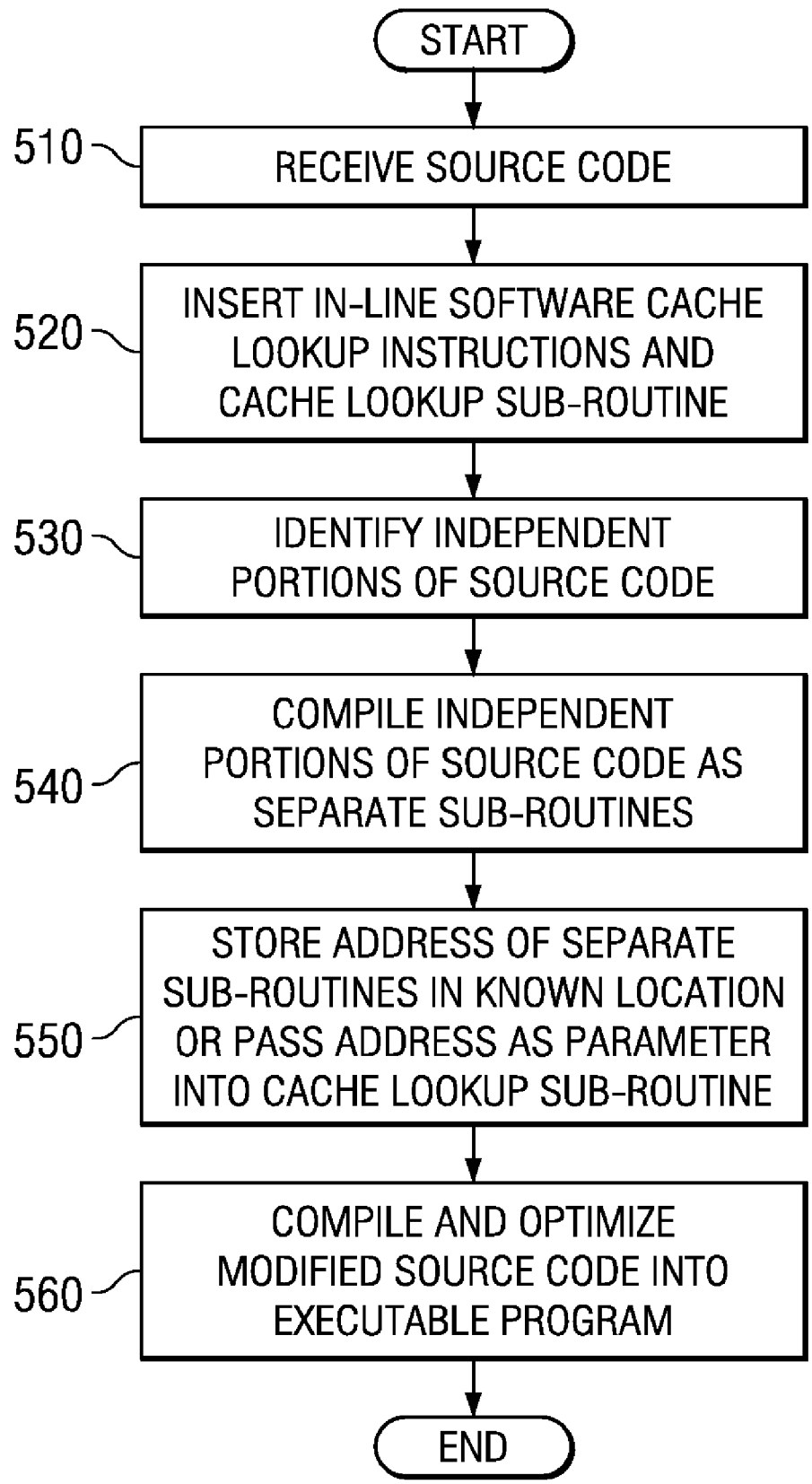

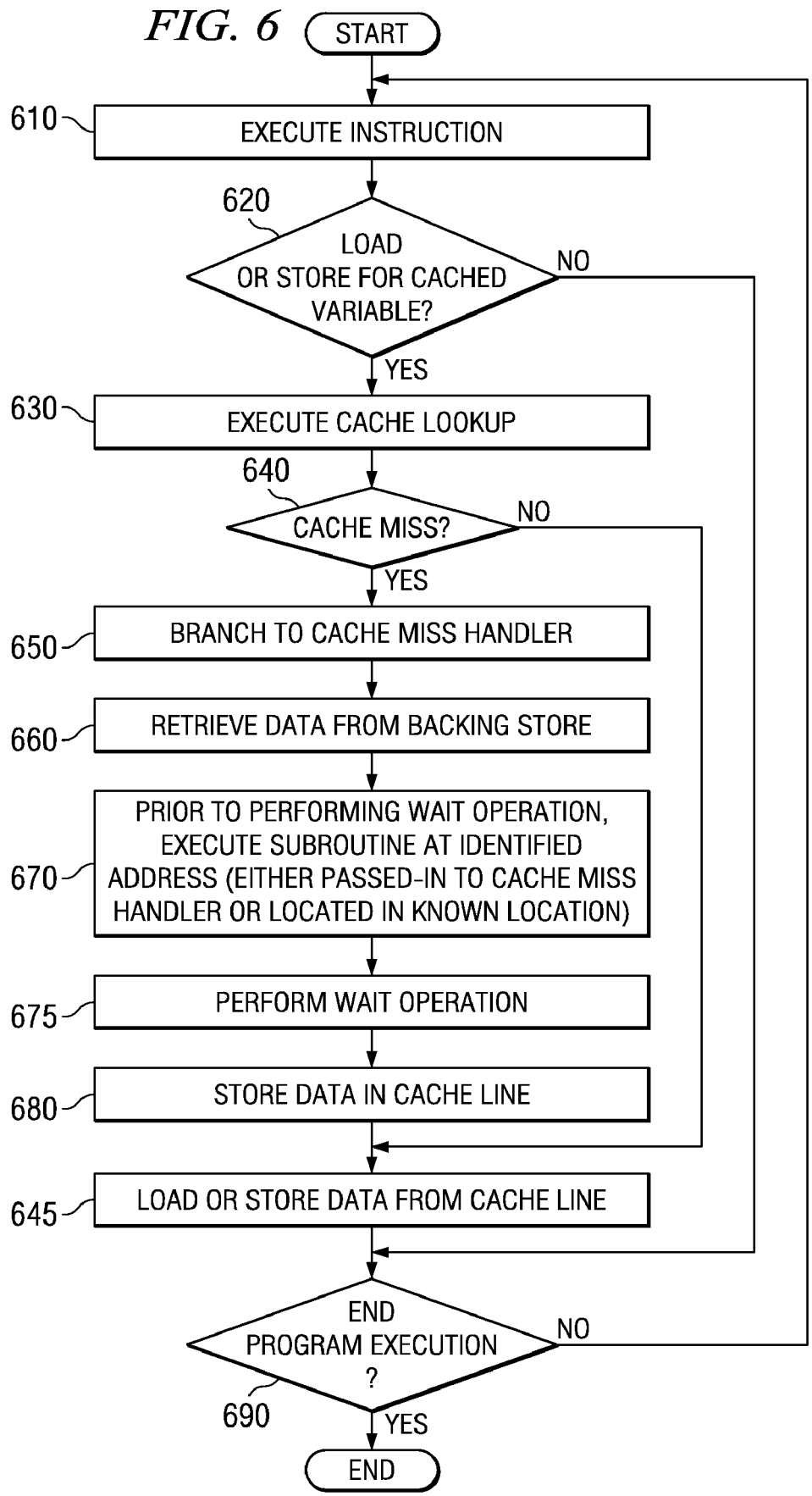

PERFORMING USEFUL COMPUTATIONS WHILE WAITING FOR A LINE IN A SYSTEM WITH A SOFTWARE IMPLEMENTED CACHE

This application is a continuation of application Ser. No. 11/421,505, filed Jun. 1, 2006, now U.S. Pat. No. 7,461,205.

BACKGROUND

1. Technical Field

The present application relates generally to an improved data processing system. More specifically, the present application is directed to mechanisms for performing useful computations while waiting for a line in a system with a software implemented cache.

2. Description of Related Art

A cache is a collection of data duplicating original values stored elsewhere or computed earlier. The original data that is cached is typically expensive to fetch, in terms of access time, or compute relative to reading the cache. Once the data is stored in the cache, future use can be made by accessing the cached copy rather than re-fetching or re-computing the original data. As a result, the average access time is lower.

Processor caches are generally managed entirely by hardware. Other caches are managed by a variety of software. Hardware managed caches are referred to generally as hardware caches while software managed caches are generally referred to as software caches. In either case, a hardware bank of registers is typically used to store the data for the cache.

The cache is essentially a pool of entries. Each entry has a datum, which is a copy of the datum in a backing store. Each entry also has a tag, which specifies the identity of the datum in the backing store of which the entry is a copy. When a cache client, e.g., a CPU, web browser, operating system, etc., wishes to access a datum presumably in the backing store, it first checks the cache. If an entry can be found with a tag matching that of the desired datum, the datum in the entry is used instead. This situation is known as a cache hit. The percentage of accesses that result in cache hits is known as the hit rate or hit ratio of the cache.

The alternative situation, i.e. when the cache is consulted and the datum with the desired tag is not found in the cache, is known as a cache miss. With a cache miss, the datum must be re-fetched from the backing store or otherwise re-calculated. The datum fetched from the backing store during miss handling is usually inserted into the cache, ready for the next access.

If the cache has limited storage, it may have to eject some other entry in order to make room for the re-fetched datum. The heuristic used to select the entry to eject is known as the replacement policy. One popular replacement policy, least recently used (LRU), replaces the least recently used entry.

When a datum is written to the cache, it must at some point be written to the backing store as well. The timing of this write is controlled by what is known as the write policy. In a write-through cache, every write to the cache causes a write to the backing store. Alternatively, in a write-back cache, writes are not immediately mirrored to the store. Instead, the cache tracks which of its locations have been written over (these locations are marked dirty). The data in these locations is written back to the backing store when that data is evicted from the cache. For this reason, a miss in a write-back cache will often require two memory accesses to service.

Cache misses may be very expensive to the execution of a program both in terms of the access time to re-fetch the datum that is missing in the cache as well as the lost processing ability while waiting for the re-fetched datum. That is, the process of re-fetching the datum from the backing store requires a relatively large access time in which the instructions requiring the datum must wait for the datum to be re-fetched and stored in the cache. Thus, a number of processing cycles may be lost in which useful computations may be performed but are not due to the fact that the required datum is not present in the cache.

SUMMARY

In one illustrative embodiment, a computer program product comprising a tangible computer useable medium having a computer readable program is provided. The computer readable program, when executed on a computing device, causes the computing device to process a software cache lookup instruction in a program, perform a software cache lookup operation, determine if the software cache lookup operation results in a cache miss, and initiate, by a cache miss handler, a retrieval of data from a backing store in response to results of the software cache lookup operation resulting in a cache miss. The computer readable program further causes the computing device to branch, by the cache miss handler, execution to an independent subroutine that executes while execution of the program waits for retrieval of the data from the backing store.

The independent subroutine is compiled into a separate subroutine that is stored in a known address location. The known address location is passed into the cache miss handler as a parameter to thereby cause the cache miss handler to execute the independent subroutine at the known address location after initiating retrieval of data from the backing store. The computer readable program causes the computing device to initiate a retrieval of data from a backing store in a first thread of execution and branch execution to an independent subroutine in a second thread of execution. Useful work is performed during cache miss handling by performing a thread switch operation between the first and second threads. The compiler specified independent subroutine comprises a code sequence that does not cause another cache miss due to the independent subroutine being a portion of code that does not reference a portion of code associated with the software cache lookup instruction, does not reference variables that are common between the independent subroutine and the portion of code associated with the software cache lookup instruction, and does not reference aliases of variables used in other portions of code.

These and other features and advantages of the present invention will be described in, or will become apparent to those of ordinary skill in the art in view of, the following detailed description of the illustrative embodiments of the present invention.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2 is an exemplary diagram illustrating the insertion of an explicit cache lookup instruction in a portion of the source code of a program;

FIG. 3 is an exemplary diagram illustrating an example of compiled code including a miss handler instruction in accordance with one illustrative embodiment;

FIG. 5 is a flowchart outlining an exemplary operation for compiling and optimizing source code in accordance with one illustrative embodiment; and FIG. 6 is a flowchart outlining an exemplary operation for cache miss handling in accordance with one illustrative embodiment.

DETAILED DESCRIPTION OF THE PREFERRED EMBODIMENTS

Figure 1:
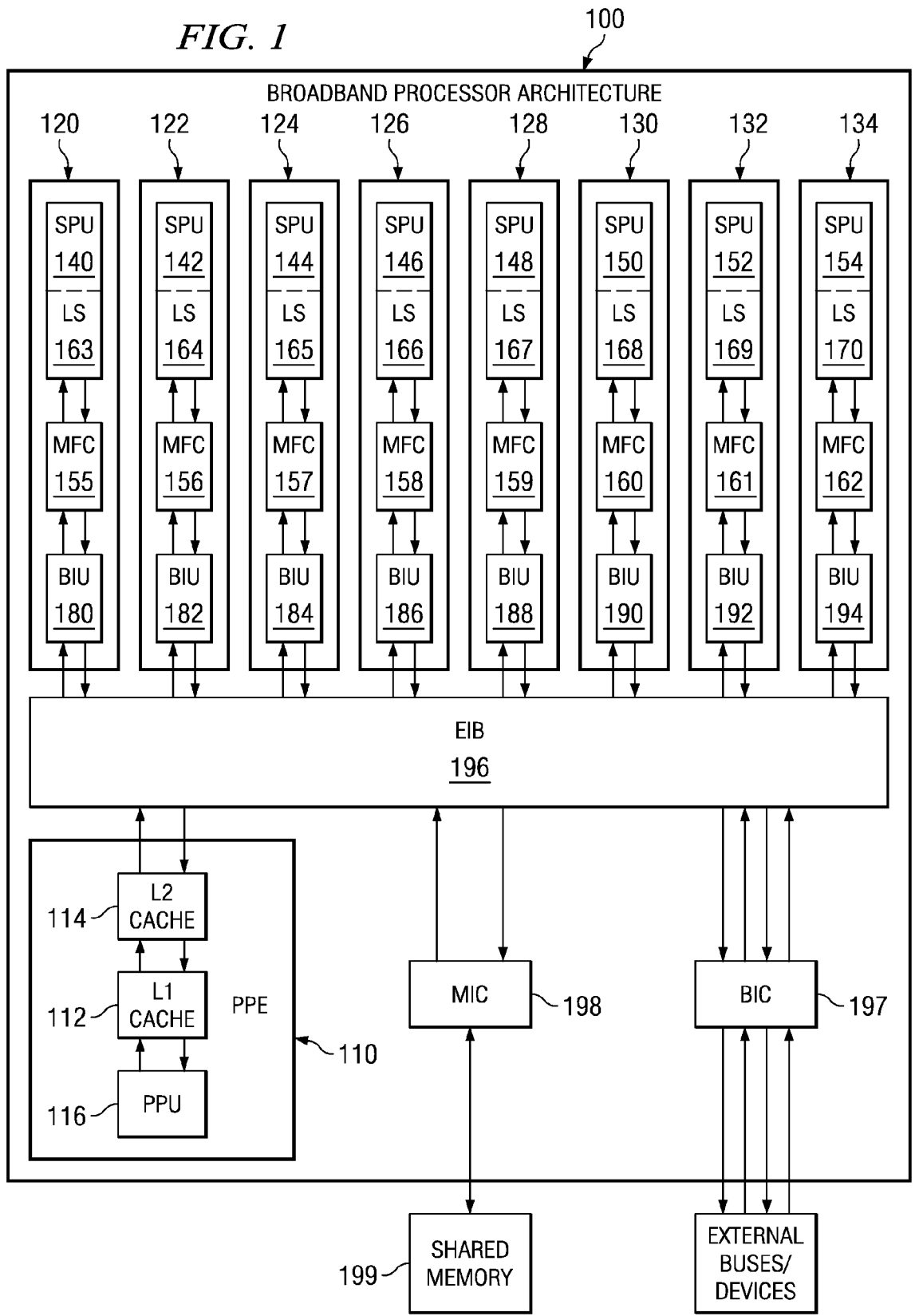
FIG. 1 is an exemplary diagram of an information handling device in which exemplary aspects of an illustrative embodiment may be implemented.

An illustrative embodiment provides an apparatus and method for handling cache misses such that useful computations may be performed while waiting for the cache line to be retrieved from the backing store. The mechanisms of the illustrative embodiment may be implemented in any microprocessor having a software implemented cache. FIG. 1 hereafter provides one example of a data processing system in which exemplary aspects of an illustrative embodiment may be implemented. FIG. 1 is provided only as an example and is not intended to state or imply any limitation with regard to the particular architectures in which the present invention may be implemented. Many modifications to the depicted architecture may be made without departing from the spirit and scope of the present invention.

FIG. 1 is an exemplary block diagram of a data processing system in which exemplary aspects of an illustrative embodiment may be implemented. The exemplary data processing system shown in FIG. 1 is an example of the Cell Broadband Engine architecture (CBEA) data processing system, also known as the Broadband Processor Architecture. While the CBEA will be used in the description of the illustrative embodiments, the present invention is not limited to such, as will be readily apparent to those of ordinary skill in the art upon reading the following description.

As shown in FIG. 1, the CBEA 100 includes a power processor element (PPE) 110 having a processor (PPU) 116 and its L1 and L2 caches 112 and 114, and multiple synergistic processor elements (SPEs) 120-134 that each has its own synergistic processor unit (SPU) 140-154, memory flow control 155-162, local memory or store (LS) 163-170, and bus interface unit (BIU unit) 180-194 which may be, for example, a combination direct memory access (DMA), memory management unit (MMU), and bus interface unit. A high bandwidth internal element interconnect bus (EIB) 196, a bus interface controller (BIC) 197, and a memory interface controller (MIC) 198 are also provided.

The CBE 100 may be a system-on-a-chip such that each of the elements depicted in FIG. 1 may be provided on a single microprocessor chip. Moreover, the CBEA 100 is a heterogeneous processing environment in which each of the SPUs may receive different instructions from each of the other SPUs in the system. Moreover, the instruction set for the SPUs is different from that of the PPU, e.g., the PPU may execute Reduced Instruction Set Computer (RISC) based instructions while the SPU execute vectorized instructions.

The SPEs 120-134 are coupled to each other and to the L2 cache 114 via the EIB 196. In addition, the SPEs 120-134 are coupled to MIC 198 and BIC 197 via the EIB 196. The MIC 198 provides a communication interface to shared memory 199. The BIC 197 provides a communication interface between the CBEA 100 and other external buses and devices.

The PPE 110 is a dual threaded PPE 110. The combination of this dual threaded PPE 110 and the eight SPEs 120-134 makes the CBEA 100 capable of handling 10 simultaneous threads and over 128 outstanding memory requests. The PPE 110 acts as a controller for the other eight SPEs 120-134 which handle most of the computational workload. The PPE 110 may be used to run conventional operating systems while the SPEs 120-134 perform vectorized floating point code execution, for example.

The SPEs 120-134 comprise a synergistic processing unit (SPU) 140-154, memory flow control units 155-162, local memory or store 160-174, and an interface unit 180-194. The local memory or store 160-174, in one exemplary embodiment, comprises a 256 KB instruction and data memory which is visible to the PPE 110 and can be addressed directly by software.

The PPE 110 may load the SPEs 120-134 with small programs or threads, chaining the SPEs together to handle each step in a complex operation. For example, a set-top box incorporating the CBEA 100 may load programs for reading a DVD, video and audio decoding, and display, and the data would be passed off from SPE to SPE until it finally ended up on the output display. At 4 GHz, each SPE 120-134 gives a theoretical 32 GFLOPS of performance with the PPE 110 having a similar level of performance.

The memory flow control units (MFCs) 155-162 serve as an interface for an SPU to the rest of the system and other elements. The MFCs 155-162 provide the primary mechanism for data transfer, protection, and synchronization between main storage and the local storages 160-174. There is logically an MFC for each SPU in a processor. Some implementations can share resources of a single MFC between multiple SPUs. In such a case, all the facilities and commands defined for the MFC must appear independent to software for each SPU. The effects of sharing an MFC are limited to implementation-dependent facilities and commands.

The illustrative embodiments provide a mechanism for handling cache misses such that useful work may be performed while awaiting retrieval the data from a backing store. The mechanism of the illustrative embodiments may be implemented in any of the SPUs and/or the PPU in the architecture shown in FIG. 1, for example. In the illustrative embodiments described hereafter, the cache is a software cache maintained in a SPE while the backing store is a system memory of the PPE, for example.

In one illustrative embodiment, using the above CBE architecture, because the local stores of the SPEs are limited in their capacity and hardware caching is not implemented, the compiler may maintain software caches in the local stores of each SPE. The software caches are made up of two arrays, a tag array and a data array. The tag array contains the comparands for the address lookup operations and pointers to the data lines. In addition, the tag array may contain "dirty bits" for multiprocessor support so as to identify which lines contain dirty bytes. The data array contains the data lines. In one illustrative embodiment, the geometry of the software cache is a 4-way set associative geometry with line sizes of 128 bytes with 128 lines in each set. The total size of the software cache in this illustrative embodiment is thus 80K, i.e. 16K for the tags and 64K for the data.

In order to make use of the software cache, the compiler inserts cache lookup instructions inline in the original source code of the program during compilation of the source code. For example, cache lookup instructions are inserted at each read or write reference to a cacheable variable.

FIG. 2 is an exemplary diagram illustrating the insertion of an explicit cache lookup instruction in a portion of the source code of a program. As shown in FIG. 2, an original portion of source code 210 contains a "for" loop with an instruction 215 involving a read of the cacheable variable d[f(i)]. When compiling this original portion of source code, the compiler, in order to utilize software caching with the compiled code, inserts an explicit cache lookup instruction in the "for" loop in association with the d[f(i)] variable. As shown in FIG. 2, the modified code 220 with the inserted explicit cache lookup instruction 230 replaces the original instruction 215 with the explicit cache lookup instruction 230.

In addition, at some point in the modified code 230 the inline vector cache lookup subroutine 240 is inserted in order to branch to a cache miss handler for handling cache misses when executing inserted cache lookup instructions, such as cache lookup instruction 230. It should be noted that the example shown in FIG. 2 uses a one-way cache lookup subroutine 240 for simplicity. In a preferred embodiment, a four-way cache lookup subroutine is utilized. It should be appreciated that the illustrative embodiments are not limited to any particular cache lookup subroutine.

As shown in FIG. 2, the cache lookup subroutine 240 receives as a parameter the address of the data/instruction that is the subject of the cache lookup and determines whether the address and key mask of the cache directory is not equal to the address and tag mask. In other words, the subroutine 240 determines if there is a cache miss, in a manner generally known in the art. If there is a cache miss, the execution branches to the miss_handler and passes as a parameter the address of the data/instruction that is the subject of the cache lookup.

In one illustrative embodiment, to handle a cache miss, the cache miss handler selects a cache line in a set to be evicted. For example, in a 4-way set associative software cache, one of the 4 lines is chosen for eviction, possibly by an aging process. The dirty bytes of the chosen line are written back to system memory. In a single processor case, the whole line may be written back to system memory rather than writing back only the dirty bytes since the unmodified bytes in the line will be the same as the equivalent bytes in system memory. This is an optimization that saves time by allowing the program to not keep track of dirty bytes. DMA locking instructions are used to lock the line in system memory while the update is performed, thus preventing concurrent updates by other SPEs.

The result of the miss_handler is returned as cache data and stored in the appropriate portion of the local store cache. The cache miss handler may use a direct memory access (DMA) operation to provide the required data from the backing store possibly along with some suitable quantity of surrounding data. Thus, the requested line is transferred from the system memory to the software cache and control is returned to the inline cache lookup code 240 in the requesting program.

The modified code 220 illustrated in FIG. 2 is compiled and optimized by the compiler to generate a compiled program that may be executed on a processor, such as a SPU. FIG. 3 is an exemplary diagram illustrating an example of compiled code including a miss handler instruction 310. The branch to the miss handler is treated as a regular instruction throughout compilation and optimization and is expanded only at the very end of compilation.

In accordance with the mechanisms of the illustrative embodiments, the cache miss handler is configured such that when the cache miss handler issues a request for a cache line from a backing store, but before the cache miss handler performs a wait operation, the cache miss handler may call a compiler specified subroutine which can perform useful work (It should be appreciated that the term "subroutine" as it is used here and elsewhere in this description is not intended to preclude execution of arbitrary fragments of code). The work to be performed may be determined by the compiler and may be other computations that will be needed in the future by the same program, unrelated work on behalf of another program, e.g., a co-routine, collecting information about the program's behavior for use at a later time, or the like.

In one illustrative embodiment, when the cache miss handler is called, the address of a code sequence to be performed is passed as a parameter. For example, in addition to the address of the data/instruction that is the subject of the cache lookup operation, a parameter identifying an address of a portion of code to be executed in the event of a cache miss may be passed to the cache lookup subroutine 240 in FIG. 2.

In another illustrative embodiment, the address of the code sequence is stored in a well known location, e.g., one or more dedicated registers, to the compiler and thus, need not be passed as a parameter. In such a case, the cache miss handler is pre-programmed with the location where the address of the portion of code to be executed during cache miss handling is stored. The compiler may then load into this location, the address of the portion of code to be executed and the cache miss handler will access that address when a cache miss is encountered.

When the cache miss handler is about to wait for the cache line to be returned from the backing store, the cache miss handler may call this code sequence as a subroutine using either the passed-in address or the address stored in the well known location, depending upon the particular implementation. The code sequence will return when it is finished.

It may be necessary to limit the type of work that is performed in this code sequence by placing limitations on the types of code sequences that the compiler may select for execution during cache miss handling. For example, it may be desirable to prevent the code sequence from causing another cache miss. This may be done, for example, by having the compiler select only code sequences which did not reference any cacheable variables.

As mentioned above, the code sequence that may be executed during a cache miss handling operation may be any type of code sequence that performs useful work and that does not violate any limitations established by the compiler for such code sequences. In one illustrative embodiment, the code sequence is portions of the source code that are independent of other portions of the source code. For example, as part of the compilation and/or optimizations performed by the compiler, the compiler may identify portions of the compiled code that may be independent of each other, e.g., do not reference each other, reference variables that are common between the portions of the code, do not reference aliases of variables used in the other portions of the code, or the like. One way in which independent portions of the code may be identified is by building a control and data dependence directed graph for the code. Sub-graphs which have no path connecting them in this directed graph are independent portions of code. These independent code portions may be compiled into separate sub-routines with their addresses being known to the compiler or otherwise stored in a well known location accessible by the compiler.

The compiler may provide these addresses as passed-in parameters in calls to the inline cache lookup routine, e.g., subroutine 240, or may store the addresses at well known locations that are known to the cache miss handler. The cache miss handler, prior to performing a wait operation, may branch execution to the one or more independent code portions using the addresses either passed-in or otherwise made known to the cache miss handler so that they may be executed while waiting for the required data to be retrieved from the backing store.

It should be noted that in the above illustrative embodiments it may be necessary to share resources, e.g., a register file, between the original code sequence in which the cache miss is encountered and the one or more independent portions of code that are executed during cache miss handling. In one illustrative embodiment, in order to perform such sharing of resources, the current state of the registers that are going to be used by the one or more independent portions of code need to be saved to a different location and then restored after execution of the one or more independent portions of code. This saving and restoring may be accomplished by convention or by the execution of appropriate save and restored codes.

Alternatively, the registers may be partitioned into sets such that one set of the registers are utilized for the execution of the original code sequence in which the cache miss occurs, and one or more other sets of registers are utilized for the execution of independent portions of code during cache miss handling. In this way, save and restore codes are not necessary since no data in the first set of the registers will be overwritten by the execution of the one or more independent portions of code.

Figure 4:
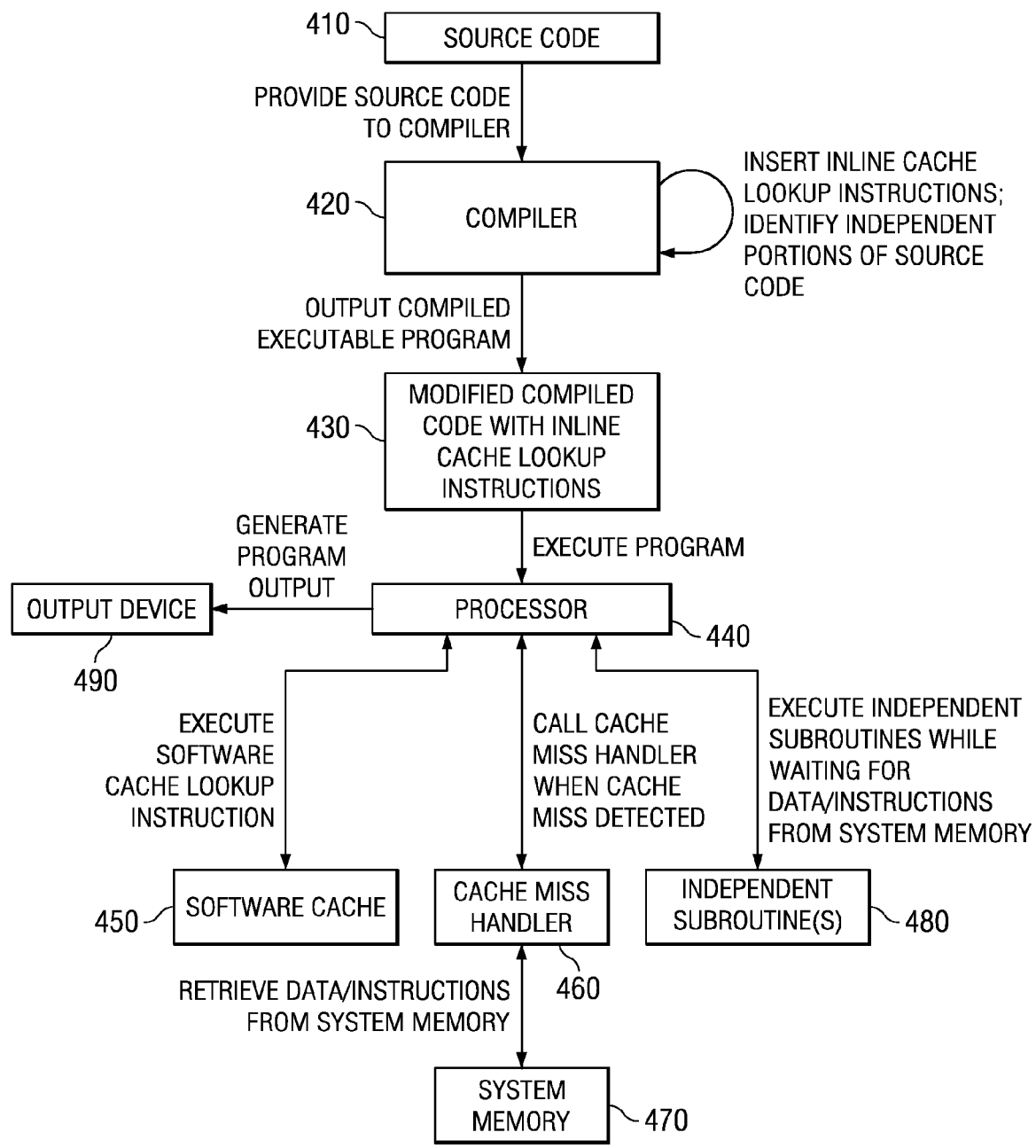
FIG. 4 is an exemplary block diagram illustrating an operation of a software cache lookup and cache miss handler in accordance with one illustrative embodiment.

FIG. 4 is an exemplary block diagram illustrating an operation of a software cache lookup and cache miss handler in accordance with one illustrative embodiment. As shown in FIG. 4, source code 410 is provided to a compiler 420. The compiler 420 inserts inline cache lookup instructions in the source code where the source code accesses cacheable variables, e.g., where there is a read or write of a cacheable variable. In addition, the compiler may identify independent portions of the source code that may be executed independently of the other portions of source code and compiles these independent portions or source code as separate sub-routines. The addresses of these sub-routines are either added as input parameters to a cache lookup sub-routine inserted into the source code or stored in a known location that is known to a cache miss handler. The resulting modified source code is then optimized and compiled into an executable program, i.e. the modified compiled code with in-line cache lookup instructions 430.

The executable program is executed by a processor 440, e.g., an SPU. During execution of the program, the processor 440 may encounter a software cache lookup instruction that was inserted by the compiler 420. As a result, the processor 440 may perform a software cache lookup in the software cache 450 and determine if the lookup results in a cache hit or cache miss. If the cache lookup operation results in a cache hit, then the results of the cache lookup are returned to the program and execution of the program continues in a normal fashion until a next cache lookup operation is encountered.

If the cache lookup operation results in a cache miss, a cache miss handler is executed by the processor 440. The executing of the cache miss handler may include, in one illustrative embodiment, passing-in parameters identifying one or more addresses of sub-routines that may be executed by the processor 440, either in the same or a different thread of execution, while the cache miss handler awaits the retrieval of the required data/instructions corresponding to the cache miss from the system memory 470. Alternatively, as previously mentioned above, the cache miss handler 460 may be pre-programmed with one or more known locations in memory at which the address for such independent sub-routines are stored and may access these addresses using these known locations in memory.

As a result, the cache miss handler 460 may cause the processor 440 to execute one or more independent sub-routines 480 while the retrieval of the data/instructions from the system memory 470 is being performed. In a preferred embodiment, this execution of independent sub-routines is performed by a separate execution thread from the execution thread in which the reloading of data/instructions from the system memory 470 is occurring. Thus, the cache miss handler 460 initiates a thread context switch between the first thread in which the reload from system memory 470 is being performed to a second thread in which the independent sub-routine is executed prior to the first thread executing a wait operation. When the results of the reload from the system memory 470 are returned, a thread context switch from the second thread to the first thread is performed. During this thread switching results of the various operations are stored in registers or storage locations that may be used later after the thread switches.

As noted above, with the mechanisms of the illustrative embodiments, it may be necessary to share resources between the first thread and second thread of execution. Thus, the execution of independent subroutines using the second thread of execution may cause writing over of registers in a register file that are also being utilized by the first thread. As a result, it is necessary to save the values of these registers to memory locations prior to performing the thread context switch and then reload these values from the memory to the appropriate registers after completion of the execution of the independent sub-routines. Such saving and reloading of values from registers of a register file is generally known in the art and thus, a detailed description is not provided herein.

Alternatively, a portion of the registers may be apportioned for use with independent sub-routines that are executed during cache miss handling. In such an embodiment, no overwriting of values in registers occurs since the original program does not use these registers when executing. Thus, there is no need to save and reload values in this dedicated portion of the registers. While this eliminates the need to save values from, and reload values into, the register file, either the portion of the register file usable by the program is reduced or the size of the register file must be increased to provide the dedicated portion of registers for use with independent sub-routines executed during cache miss handling.

FIGS. 5 and 6 are flowcharts outlining exemplary operations of the illustrative embodiments. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

FIG. 5 is a flowchart outlining an exemplary operation for compiling and optimizing source code in accordance with one illustrative embodiment. As shown in FIG. 5, the operation starts with the compiler receiving source code (step 510). The compiler inserts in-Line software cache lookup instructions and a cache lookup sub-routine is inserted into the source code at appropriate locations (step 520). The compiler identifies independent portions of source code (step 530) and compiles the identified independent portions of source code as separate sub-routines (step 540). The compiler stores the addresses of the separate sub-routines in a known location or passes the addresses as parameters into the cache lookup sub-routine (step 550). The compiler then optimizes and compiles the modified source code into an executable program (step 560) and the operation terminates.

FIG. 6 is a flowchart outlining an exemplary operation for cache miss handling in accordance with one illustrative embodiment. As shown in FIG. 6, the operation starts with the processor executing an instruction of a program (step 610). The processor determines if a load or store instruction for a cached variable is encountered (step 620). If so, the cache lookup operation is executed, e.g., via an inline cache lookup subroutine in the program (step 630). The processor determines if a cache miss has occurred as a result of the cache lookup operation (step 640).

If a cache miss has occurred, the execution of the instruction by the processor branches to a cache miss handler (step 650). The cache miss handler initiates retrieval of data/instructions corresponding to the address that is the subject of the cache lookup instruction from the backing store, e.g., the system memory (step 660). Prior to performing a wait operation, the independent subroutine at the identified address (either passed in as a parameter or stored in a known location) is executed (step 670).

Thereafter, results of the cache lookup are returned and stored in a cache line (step 680). Thereafter, or if no cache miss has occurred, a load or store of the data from the cache line, depending on the particular operation required, is performed (step 645). A determination is then made as to whether the program execution has ended (step 690). If not, the operation returns to step 610 and continues to execute the program with a next instruction in the program code. If execution of the program has ended, the operation terminates.

Thus, the illustrative embodiments provide a mechanism by which useful work may be performed while awaiting the reload of instructions/data into a software cache. The illustrative embodiments may branch to an independent portion of code of the same program, a separate program from program that caused the cache miss, sub-routines for characterizing the operation of the program, or the like. Any type of useful work may be performed during the processor cycles in which the processor would normally be idle waiting for data/instructions to be fetched from the backing store. As a result, program execution is made more efficient.

The illustrative embodiments may take the form of an entirely software embodiment or an embodiment containing both hardware and software elements. In a preferred embodiment, the invention is implemented in software, which includes but is not limited to firmware, resident software, microcode, etc.

Furthermore, the illustrative embodiment may take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

FIG. 1 provides one illustrative embodiment of a data processing system or information handling system in which the illustrative embodiments may be utilized. However, the present invention is not limited to the particular architecture shown in FIG. 1. Many modifications to the architecture shown in FIG. 1 may be made without departing from the spirit and scope of the present invention. In short, a data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the illustrative embodiments has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a tangible computer useable storage medium having a computer readable program stored thereon, wherein the computer readable program, when executed on a computing device, causes the computing device to:
　　process a software cache lookup instruction in a program;
　　perform a software cache lookup operation;
　　determine if the software cache lookup operation results in a cache miss;
　　initiate, by a cache miss handler, a retrieval of data from a backing store in response to results of the software cache lookup operation resulting in a cache miss; and
　　branch, by the cache miss handler, execution to an independent subroutine that executes while execution of the program waits for retrieval of the data from the backing store, wherein:

the independent subroutine is compiled into a separate subroutine that is stored in a known address location, the known address location is passed into the cache miss handler as a parameter to thereby cause the cache miss handler to execute the independent subroutine at the known address location after initiating retrieval of data from the backing store, the computer readable program causes the computing device to initiate a retrieval of data from a backing store in a first thread of execution and branch execution to an independent subroutine in a second thread of execution, useful work is performed during cache miss handling by performing a thread switch operation between the first and second threads, and the independent subroutine comprises a code sequence that does not cause another cache miss due to the independent subroutine being a portion of code that does not reference a portion of code associated with the software cache lookup instruction, does not reference variables that are common between the independent subroutine and the portion of code associated with the software cache lookup instruction, and does not reference aliases of variables used in other portions of code.

2. The computer program product of claim 1, wherein the computer readable program further causes the computing device to:

partition registers into a first set of registers for use by the first thread of execution and a second set of registers used by the second thread of execution.

3. The computer program product of claim 1, wherein the computer readable program further causes the computing device to:

store a current state of registers required by the independent subroutine to another storage location before executing the independent subroutine; and restore the current state from the other storage location after completing execution of the independent subroutine.

\* \* \* \* \*